US012559061B2

(12) United States Patent
Li et al.

(10) Patent No.: US 12,559,061 B2
(45) Date of Patent: Feb. 24, 2026

(54) INTEGRATION OF VEHICLE SENSORS WITH REMOTE SYSTEM SENSORS

(71) Applicant: GM Global Technology Operations LLC, Detroit, MI (US)

(72) Inventors: Chuan Li, Troy, MI (US); Esther Anderson, Canton, MI (US); Jinzhu Chen, Troy, MI (US); Jace C. Stokes, Highland, MI (US); Fan Bai, Ann Arbor, MI (US); Lakshmi V. Thanayankizil, Troy, MI (US); Paul E. Krajewski, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 292 days.

(21) Appl. No.: 18/501,193

(22) Filed: Nov. 3, 2023

(65) Prior Publication Data

US 2025/0145111 A1 May 8, 2025

(51) Int. Cl.
| | |
|---|---|
| B60R 25/102 | (2013.01) |
| B60R 25/30 | (2013.01) |
| B60R 25/31 | (2013.01) |
| B60R 25/40 | (2013.01) |
| G07C 5/00 | (2006.01) |

(52) U.S. Cl.
CPC .......... B60R 25/102 (2013.01); B60R 25/305 (2013.01); B60R 25/31 (2013.01); B60R 25/403 (2013.01); G07C 5/008 (2013.01)

(58) Field of Classification Search
CPC ..... B60R 25/102; B60R 25/305; B60R 25/31; B60R 25/403; G07C 5/008
See application file for complete search history.

(56) References Cited

U.S. PATENT DOCUMENTS

| | | | |
|---|---|---|---|
| 6,956,478 B2 * | 10/2005 | Oyagi .................... | G08B 25/10 |
| | | | 340/541 |
| 9,871,692 B1 * | 1/2018 | Hutz ....................... | G08B 25/14 |
| 10,155,500 B2 * | 12/2018 | Cogill .................... | B60R 25/31 |

(Continued)

FOREIGN PATENT DOCUMENTS

| | | |
|---|---|---|
| DE | 102017200160 A1 | 7/2018 |
| DE | 102020113175 A1 | 11/2021 |
| DE | 102020210210 A1 | 2/2022 |

*Primary Examiner* — Nay Tun
(74) *Attorney, Agent, or Firm* — Vivacqua Crane, PLLC

(57) ABSTRACT

A system integrating vehicle sensors with remote system sensors includes a vehicle having a controller communicating with a vehicle sensor generating data associated with a vehicle threat alert. A vehicle communication device communicating with the vehicle controller and transmitting vehicle sensor data. A remote system including a controller communicating with a remote sensor generating data associated with a remote threat alert. A communication hub communicating with the remote controller and the vehicle communication device. The vehicle communicating with the remote system through the communication hub, sharing vehicle threat alerts with the remote system, receiving and reviewing remote threat alerts from the remote system and modifying an operational mode of the vehicle sensor based on remote threat alerts. The remote network controller reviewing received vehicle threat alerts and modifying a detection mode of the remote system based on the received vehicle threat alerts.

16 Claims, 5 Drawing Sheets

(56)            References Cited

U.S. PATENT DOCUMENTS

| | | | | |
|---|---|---|---|---|
| 10,807,563 | B1 * | 10/2020 | Hwang | B60R 25/102 |
| 10,991,188 | B2 * | 4/2021 | Woo | G08B 13/1618 |
| 11,140,553 | B1 * | 10/2021 | Taylor | H04W 12/122 |
| 11,945,404 | B2 * | 4/2024 | Pham | B60R 25/31 |
| 2002/0126009 | A1 * | 9/2002 | Oyagi | G08B 27/006 |
| | | | | 340/541 |
| 2005/0062602 | A1 * | 3/2005 | Fujiwara | B60R 25/257 |
| | | | | 340/541 |
| 2007/0279209 | A1 * | 12/2007 | Kogan | B60R 25/1004 |
| | | | | 340/541 |
| 2009/0322535 | A1 * | 12/2009 | Shin | B60R 25/102 |
| | | | | 340/572.1 |
| 2012/0235803 | A1 * | 9/2012 | Bunting | B60R 25/102 |
| | | | | 340/426.27 |
| 2013/0342333 | A1 * | 12/2013 | Hutchings | G08B 13/19647 |
| | | | | 348/148 |
| 2014/0300492 | A1 * | 10/2014 | Watanabe | G08B 7/064 |
| | | | | 340/901 |
| 2015/0293509 | A1 * | 10/2015 | Bankowski | H04L 12/2818 |
| | | | | 700/275 |
| 2016/0318476 | A1 * | 11/2016 | Cogill | B60R 25/30 |
| 2018/0053403 | A1 * | 2/2018 | Wieskamp | G08G 1/164 |
| 2019/0266748 | A1 * | 8/2019 | Ahmad | G05D 1/024 |
| 2021/0097315 | A1 * | 4/2021 | Carruthers | G08B 13/19645 |
| 2021/0331648 | A1 * | 10/2021 | Pham | G01S 17/88 |
| 2022/0369066 | A1 * | 11/2022 | Somanath | H04N 7/183 |

* cited by examiner

Vehicle

100

102 — Receive data

104 — Determine and set operational mode

106 — Determine what data and information can be shared

108 — Share allowed data and information

110 — Vehicle threat determination? No

Yes

112 — Share vehicle threat alerts

114 — Share sensor data

116 — Monitor threat and record sensor data

118 — Determine if threat left sensor range? No

Yes

120 — Notify remote system

200

300

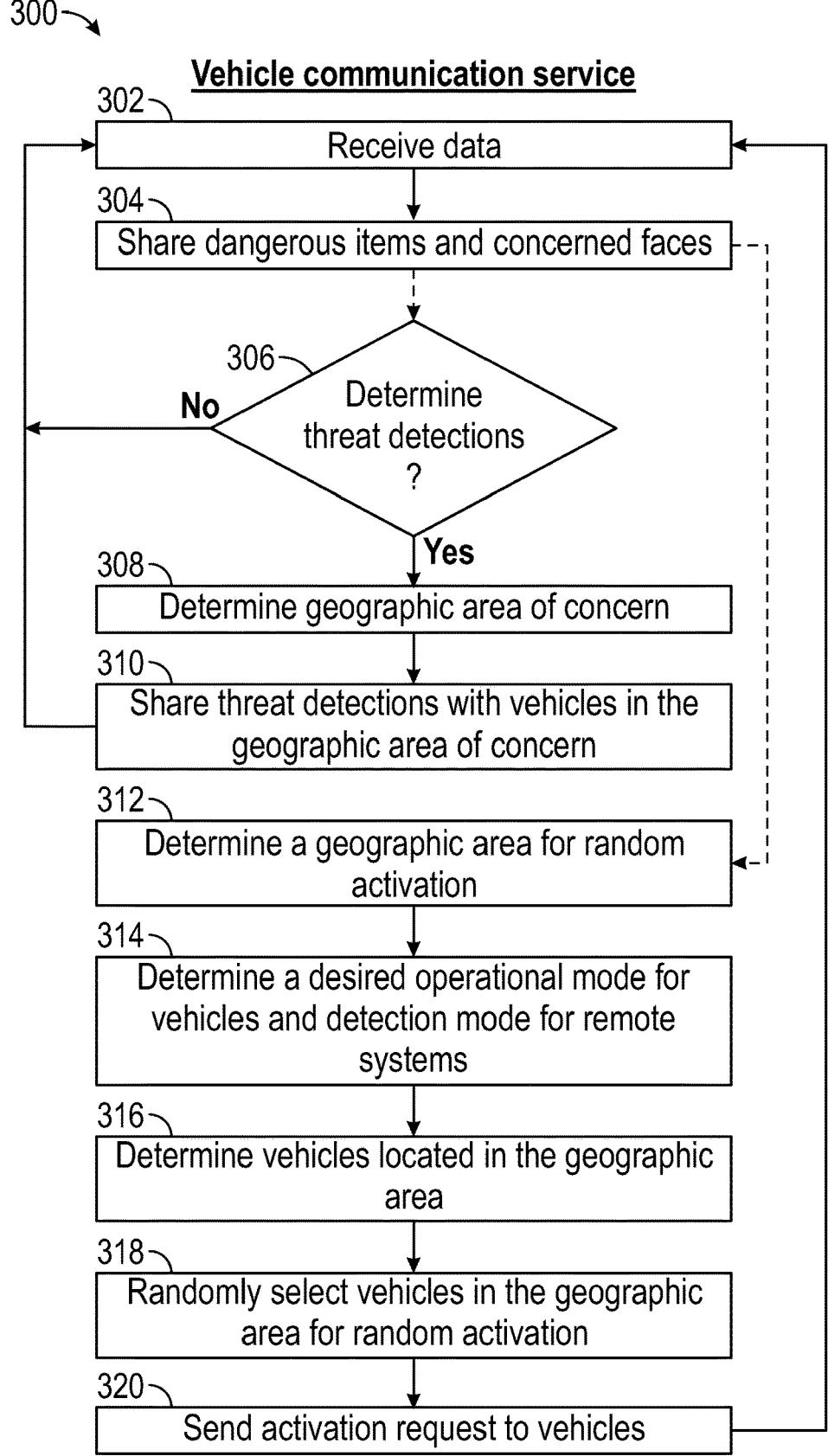

Vehicle communication service

302
Receive data

304
Share dangerous items and concerned faces

306
Determine threat detections ?

No

Yes

308
Determine geographic area of concern

310
Share threat detections with vehicles in the geographic area of concern

312
Determine a geographic area for random activation

314
Determine a desired operational mode for vehicles and detection mode for remote systems 316
Determine vehicles located in the geographic area 318
Randomly select vehicles in the geographic area for random activation 320
Send activation request to vehicles

FIG. 4

INTEGRATION OF VEHICLE SENSORS WITH REMOTE SYSTEM SENSORS

INTRODUCTION

The present disclosure relates to integrating vehicle sensors with remote system sensors.

Vehicles have sensors configured to generate data associated with a vehicle threat alert. The vehicle sensors include vehicle cameras and vehicle access detectors. The determination of a vehicle threat alert is limited to the data provided by the vehicle sensors. Remote systems for premises have sensors to generate data associated with a remote threat alert at the premises. The remote sensors include cameras and motion detectors. While these systems are useful for their intended purpose, there is a need in the art to provide collaborative threat detection between these systems.

SUMMARY

A system for integrating vehicle sensors with remote system sensors is provided. The system includes a vehicle having a vehicle controller, at least one vehicle sensor in communication with the vehicle controller and configured to generate vehicle sensor data associated with a vehicle threat alert, a vehicle communication device in communication with the vehicle controller and configured to transmit the vehicle sensor data, a remote system having a remote network controller, at least one remote sensor in communication with the remote network controller and configured to generate remote sensor data associated with a remote threat alert, and a communication hub in communication with the remote network controller and the vehicle communication device. The vehicle and the remote system communicate through the communication hub, the vehicle is operable to share vehicle threat alerts with the remote system and receive remote threat alerts from the remote system, the vehicle controller reviews received remote threat alerts and modifies an operational mode of the at least one vehicle sensor based on the received remote threat alerts, and the remote network controller reviews received vehicle threat alerts and modifies a detection mode of the remote system based on the received vehicle threat alerts.

In one aspect, the at least one vehicle sensor includes a vehicle camera operable to capture images and send the images to the vehicle controller and a vehicle access detector operable to detect opening of a vehicle access component, and the vehicle controller includes a vehicle processor and a vehicle memory. The vehicle memory including instructions such that the vehicle processor is programmed to share a location of the vehicle with the remote system, determine the vehicle threat alerts based on images from the vehicle camera and status of the vehicle access detector, communicate with the remote system, control operation of the vehicle camera, review communications received from the remote system, and share the vehicle threat alerts with the remote system.

In another aspect, the vehicle processor is further programmed to control the operational mode and the operational mode includes a relaxed mode wherein the vehicle camera is turned off and the vehicle access detector is on, a normal mode wherein the vehicle access detector is on, the vehicle camera is on if the vehicle is on, and the vehicle camera is turned on periodically at a normal set schedule to capture images if the vehicle is off, and a cautious mode wherein the vehicle access detector is on, the vehicle camera is on if the vehicle is on, and when the vehicle is off the vehicle camera is periodically turned on at a cautious set schedule that is more frequent than the normal set schedule so that the camera captures images more frequently, and the vehicle camera captured images are transmitted to the remote system.

In another aspect, the vehicle has a battery and the vehicle processor is further programmed to ascertain a voltage status of the battery, control the operational mode based on the voltage status, put the vehicle in the relaxed mode when the voltage status is a low voltage, limit changes to the operational mode out of the relaxed mode when the voltage status is a low voltage to a receipt of a remote threat alert or a threat alert from the vehicle access detector, and inform the remote system of the operational mode.

In another aspect, the remote system creates the remote threat alert when a remote person is detected by the at least one remote sensor and notifies the vehicle when the remote person moves beyond a sensor range of the at least one remote sensor and the controller puts the vehicle in the cautious mode, and the vehicle creates the vehicle threat alert when a vehicle person is detected by the at least one vehicle sensor and notifies the remote system when the vehicle person moves beyond the sensor range of the at least one vehicle sensor, and the remote system changes the detection mode to a high precision threat detection mode or an ultra precision threat detection mode.

In another aspect, the remote system detection mode includes a casual threat detection mode wherein the at least one remote sensor is turned off for a limited time period based on an input of a user of the remote system, a high precision threat detection mode which is a default detection mode and wherein the at least one remote sensor can be informed to activate and to generate remote sensor data associated with a remote threat alert, and an ultra precision threat detection mode wherein the at least one remote sensor is active on a continuous basis to generate remote sensor data associated with a remote threat alert.

In another aspect, the vehicle processor is further programed to limit information shared with the remote system based on information approval provided by an owner of the vehicle.

In another aspect, there are a plurality of vehicles and remote systems and a vehicle communication service communicating with the vehicles through cellular networks. The vehicles share vehicle threat alerts and vehicle locations with the vehicle communication service, the vehicle communication service identifies a geographic area of concern based on received vehicle threat alerts and communicates a threat detection to vehicles in the geographic area of concern, and the vehicles receiving the threat detection communicate the threat detection to associated remote systems.

In another aspect, the vehicle communication service provides information about threat images that are threat concerns based on a person or dangerous item in an image, the vehicle processor is further programmed to identify a threat alert by determining if the image captured by the vehicle camera includes threat images as provided by vehicle communication service, the remote systems provide information about person images that are not a threat concern, and the vehicle processor is further programmed to identify a camera image as not a threat alert based the person images provided by the remote systems.

In another aspect, the vehicle communication service changes the geographic area of concern and communicates the threat detection to vehicles in the changed geographic area of concern, and the vehicles receiving the threat detection communicate the threat detection to associated remote systems.

In another embodiment, a method of integrating a vehicle having at least one vehicle sensor configured to generate vehicle sensor data associated with a vehicle threat alert with a remote system having at least one remote sensor configured to generate remote sensor data associated with a remote threat alert is provided. The method includes communicating a location of the vehicle to the remote system, communicating the vehicle threat alerts with the remote system, communicating the remote threat alerts with the vehicle, modifying an operational mode of the at least one vehicle sensor based on received remote threat alerts, and modifying a detection mode of the remote system based on received vehicle threat alerts.

In one aspect, the at least one vehicle sensor includes a vehicle camera operable to capture images and a vehicle access detector operable to detect opening of a vehicle access component, the method further includes determining the vehicle threat alerts based on images from the vehicle camera and status of the vehicle access detector, controlling operation of the vehicle camera based on the operational mode, and reviewing communications received from the remote system.

In another aspect, the vehicle has a battery and the method further includes ascertaining a voltage status of the battery, adjusting the operational mode based on the voltage status so that the vehicle camera is deactivated when the voltage status is a low voltage and limiting activation of the vehicle camera when the voltage status is a low voltage to a receipt of a remote threat alert or a threat alert from the vehicle access detector, and informing the remote system of the operational mode.

In another aspect, the method further includes the remote system notifying the vehicle of a remote person concern when a remote system detected person moves beyond a sensor range of a remote sensor, and activating the vehicle camera when notified of the remote person concern.

In another aspect, the method further includes the vehicle notifying the remote system of a vehicle person concern when a vehicle detected person moves beyond a sensor range of the vehicle camera, and activating the at least one remote sensor when notified of the vehicle person concern.

In another aspect, there are a plurality of vehicles and remote systems, a vehicle communication service communicating with the vehicles through cellular networks, and the method further includes the vehicle communication service providing information about threat images that are threat concerns based on a person or dangerous item in an image, the remote systems providing information about person images that are not a threat concern, the vehicles identifying a camera image as not a threat based the information about person images provided by the remote systems, the vehicles identifying threat alerts by determining if the image captured by the vehicle camera includes threat images as provided by the vehicle communication service, the vehicles sharing vehicle threat alerts and vehicle locations with the vehicle communication service, the vehicle communication service identifying a geographic area of concern based on received vehicle threat alerts, the vehicle communication service communicating a threat detection to vehicles in the geographic area of concern, and the vehicles receiving the threat detection communicating the threat detection to associated remote systems.

In yet another embodiment, a vehicle integrating vehicle sensors with a remote system is provided. The vehicle includes a vehicle controller including a processor and a memory, vehicle sensors configured to generate vehicle sensor data associated with a vehicle threat alert, the vehicle sensors including vehicle cameras operable to capture images and send the images to the vehicle controller and vehicle access detectors operable to detect opening of a vehicle access component, and a vehicle communication device in communication with the vehicle controller configured to transmit the vehicle sensor data, and in communication with a remote system communication hub. The memory includes instructions such that the processor is programmed to communicate with remote systems, review remote threat alerts received from the remote system, control an operational mode of the vehicle sensors and activate the vehicle cameras as needed based on communication received from the remote system, share images from the vehicle cameras with the remote system if the vehicle cameras are activated and the vehicle is communicating with the remote system, determine the vehicle threat alerts based on images from the vehicle camera and status of the vehicle access detector, share the vehicle threats alert with the remote system, and communicate a location of the vehicle with the remote system.

In another aspect, the processor is further programmed to modify the operational mode based on received remote threat alerts and the operational mode includes a relaxed mode wherein the vehicle cameras are turned off and the vehicle access detectors are on, a normal mode wherein the vehicle access detectors are on and the vehicle cameras are randomly turned on and off and are turned on when the vehicle access detectors sense a threat and the vehicle camera images are transmitted to the remote system, and a cautious mode wherein the vehicle cameras are active and the vehicle camera images are transmitted to the remote system and the vehicle access detectors are on.

In another aspect, the vehicle has a battery and the vehicle processor is further programmed to ascertain a voltage status of the battery, control the operational mode based on the voltage status, put the vehicle in the relaxed mode when the voltage status is a low voltage, limit changes to the operational mode out of the relaxed mode when the voltage status is a low voltage to a receipt of a remote threat alert or a vehicle threat alert from the vehicle access detectors, and inform the remote system of the operational mode.

In another aspect, the vehicle includes a wireless communication device operable to communicate with a vehicle communication service that communicates with other vehicles having a cellular network device, the controller is in communication with the cellular network device, and the processor is further programed to share threat detections with the vehicle communication service and the remote system, receive notification of threats from the vehicle communication service, communicate received threats to the remote system, ascertain status of the vehicle, and activate the vehicle camera based on the status of the vehicle when notified of threats and share detected threats when notified of a threat.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a process flow chart of a vehicle communication service according to an exemplary embodiment;

DETAILED DESCRIPTION

The following description is merely exemplary in nature and is not intended to limit the present disclosure, application, or uses.

Figure 1:
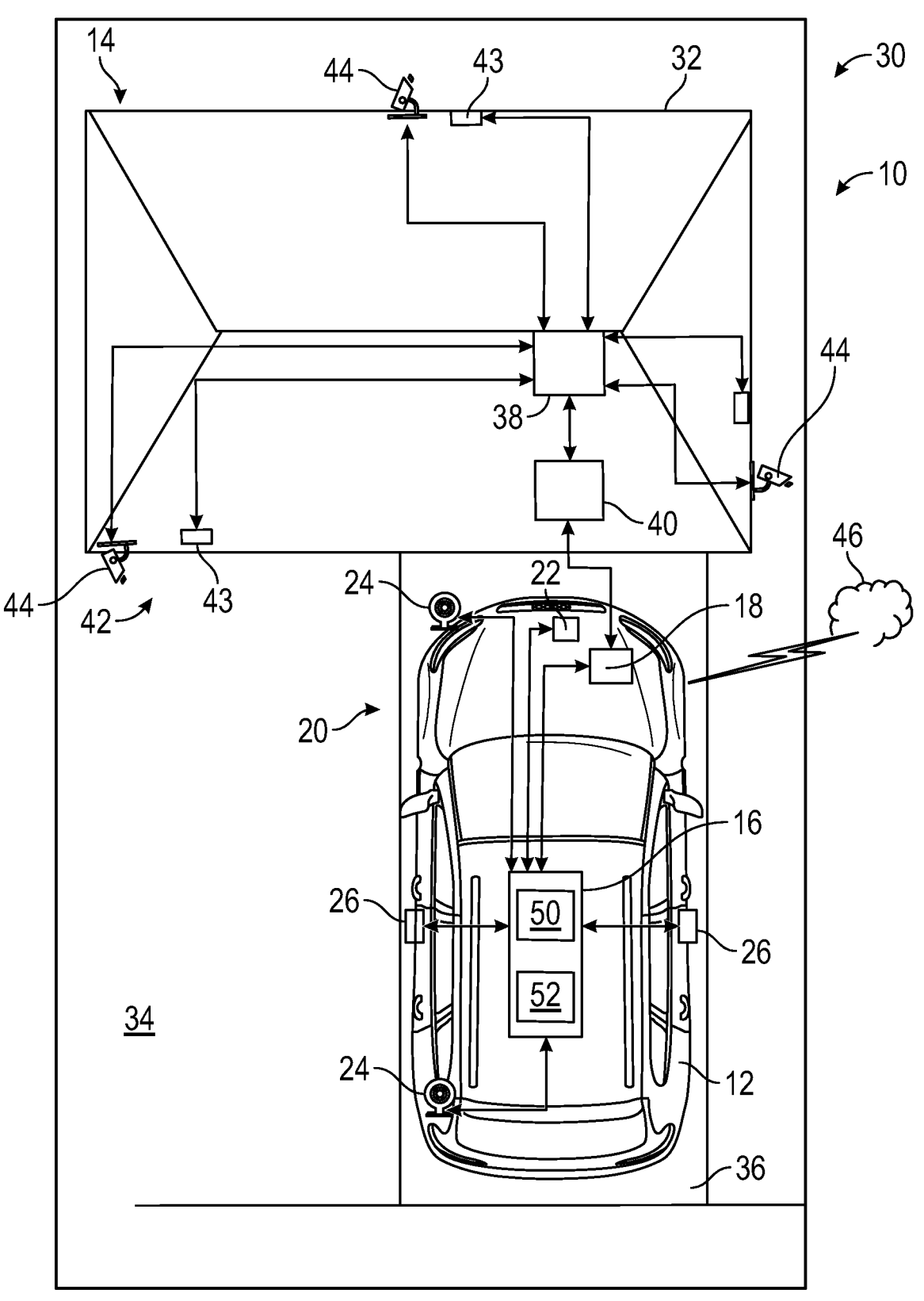
FIG. 1 is a schematic view of a system for integrating vehicle sensors with remote system sensors according to an exemplary embodiment.

Referring to FIG. 1, a system 10 integrating sensors of a vehicle 12 with sensors of a remote system 14 according to the principles of the present disclosure is shown. Although the vehicle 12 is shown as a sedan, it is envisioned that vehicle 12 may be any other type of vehicle, such as a pickup truck, a coupe, a sport utility vehicle (SUVs), a recreational vehicle (RVs), a semi-truck, etc. The vehicle 12 has a vehicle controller 16, a vehicle communication device 18, a plurality of vehicle sensors 20, and a battery 22. The vehicle sensors 20 are in communication with the vehicle controller 16 and capture and share vehicle sensor data with the vehicle controller 16. The vehicle sensors 20 include vehicle cameras 24 and vehicle access detectors 26. It should be appreciated that other sensors may be employed, including motion detectors, radar, or lidar. The vehicle cameras 24 capture images and send the images to the vehicle controller 16. The vehicle access detectors 26 detect opening of a vehicle access component and send the opening alert to the vehicle controller 16. The vehicle access components may include doors, a trunk, a hood, or other components. The vehicle controller 16 communicates with the battery 22 and determines a voltage status of the battery 22 based on the voltage level. The voltage level used to determine the voltage status may relate to various functional capabilities, such as the energy in the battery 22 and ability of vehicle 12 to be operated in a normal manner, such as the ability to be driven. Vehicle controller 16 is operable to determine a location of the vehicle 12. The vehicle controller 16 is in communication the vehicle communication device 18 and utilizes the vehicle communication device 18 to communicate as described below. The vehicle controller 16 and the vehicle communication device 18 may collaboratively operate as a vehicle communication hub.

The remote system 14 can be a variety of formats, such as a security system, a monitoring system, a data collection system, etc. The remote system 14 is associated with a premises 30 that includes a building 32 and its land 34 which may include a driveway 36 or other parking features for the vehicle 12. Building 32 can be any type of building, such as an individual home, apartments, condominiums, office building, factory, school, store, etc. The remote system 14 has a remote network controller 38, a communication hub 40, and a plurality of remote sensors 42. The remote sensors 42 are in communication with the remote network controller 38 and are configured to generate remote sensor data associated with a remote threat alert and capture and share the remote sensor data with the remote network controller 38.

The remote sensors 42 can include remote motion detectors 43 that detect motion and remote cameras 44 that capture images and send the images to the remote network controller 38. The remote motion detectors 43 may be separate items or may be integrated into the remote cameras 44. The communication hub 40 communicates with the remote network controller 38 and the vehicle communication device 18. The remote system 14 may include additional components and capabilities, such as smart speakers that can provide warnings and lights, such as flash flood lights, that can be activated to indicate a threat.

The communication hub 40 and the vehicle communication device 18 can include and utilize various communication technologies to enable the vehicle controller 16 to communicate with the remote system 14, the vehicle controller 16 to communicate directly with the remote sensors 42, the vehicle controller 16 to communicate with the vehicle sensors 20, and the remote network controller 38 to communicate with the remote sensors 42. In an exemplary embodiment, the communication technologies included and used by the vehicle communication device 18 and the communication hub 40 may be for example, a Wi-Fi device, a Bluetooth device, and other wireless communication devices. The communication between the vehicle controller 16 and the remote system 14 may communicate via Wi-Fi or Bluetooth or other wireless technologies, such as but not limited to wireless mesh networks, or high-bandwidth wireless sensor networks, and may use Internet of Things (IOT) Matter protocol. For example, IOT Matter protocol may be used to pair the vehicle 12 with a remote system 14. Electrical connections may also be utilized by the vehicle controller 16 to communicate with the vehicle sensors 20 and by the remote network controller 38 to communicate with the remote sensors 42. The vehicle communication device 18 can also include and utilize various communication technologies to enable the vehicle controller 16 to communicate directly with other vehicles 12. It should be understood that various additional wired and wireless techniques and communication protocols for communicating are within the scope of the present disclosure. The remote system 14 can selectively approve which remote sensors 42 can communicate with the vehicle controller 16 and the vehicle controller 16 may communicate with and receive data from approved remote sensors 42 either through the communication hub 40 or through direct communication with the remote sensors 42.

The system 10 may include a cloud-based vehicle communication service 46 that communicates with all of the vehicles 12. The vehicle communication service 46 communicates with the vehicle communication device 18 which enables the vehicle controller 16 to communicate with the vehicle communication service 46. The vehicle communication device 18 and the vehicle communication service 46 communicate utilizing wireless communication and may include a cellular device and communicate using cellular communication. It should be understood that various additional wireless techniques and communication protocols for communicating are within the scope of the present disclosure.

The vehicle controller 16 is used to implement a vehicle method 100 for integrating the vehicle sensors 20 of the vehicle 12 with the remote sensors 42 of the remote system 14 according to the principles of the present disclosure, as will be described below. The vehicle controller 16 includes at least one processor 50 and a non-transitory computer readable storage device or media 52. The processor 50 may be a custom made or commercially available processor, a central processing unit (CPU), a graphics processing unit (GPU), an auxiliary processor among several processors associated with the vehicle controller 16, a semiconductor-based microprocessor (in the form of a microchip or chip set), a macroprocessor, a combination thereof, or generally a device for executing instructions. The computer readable storage device or media 52 may include volatile and non-volatile storage in read-only memory (ROM), random-access memory (RAM), and keep-alive memory (KAM), for example. KAM is a persistent or nonvolatile memory that may be used to store various operating variables while the processor 50 is powered down. The computer-readable storage device or media 52 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 16 to control various systems of the vehicle 12. The vehicle controller 16 may also consist of multiple controllers which are in electrical communication with each other. The vehicle controller 16 may be inter-connected with additional systems and/or controllers of the vehicle 12, allowing the vehicle controller 16 to access data such as, for example, location of the vehicle 12.

Figure 2:
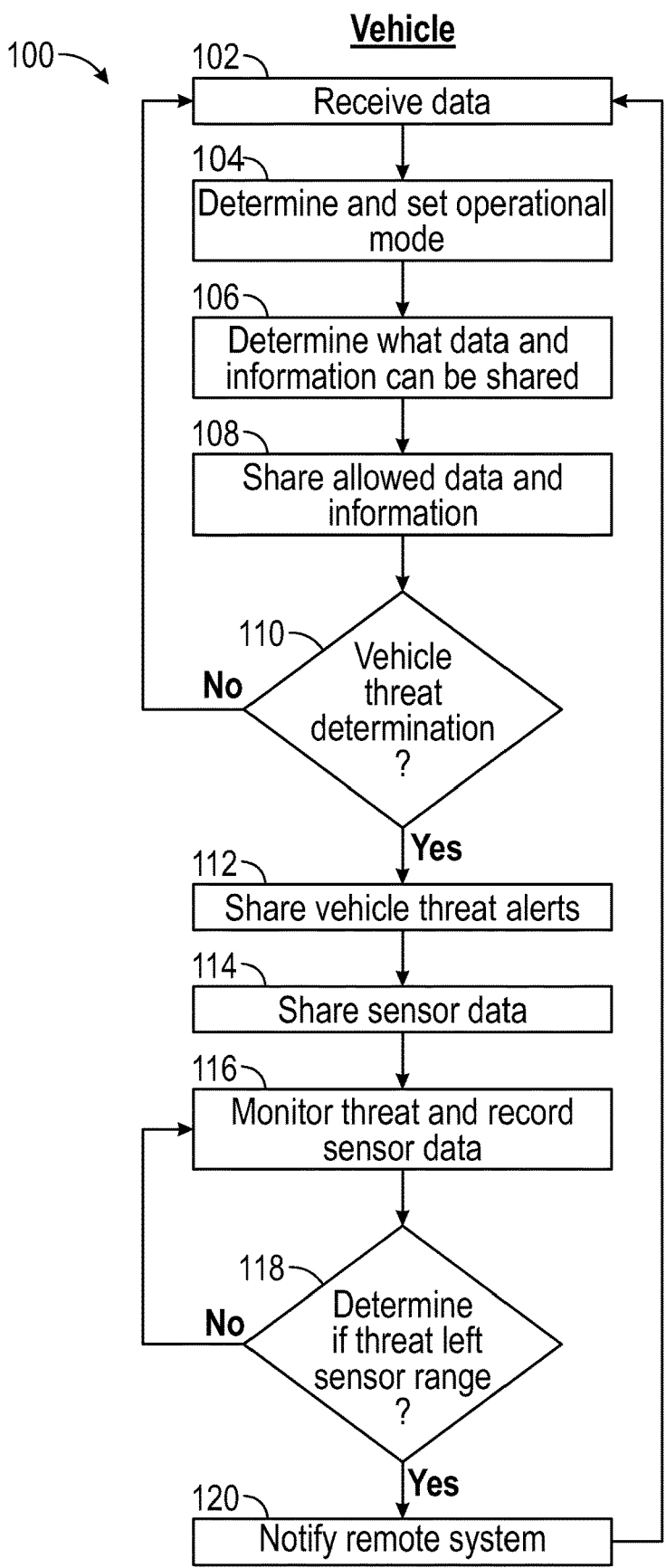
FIG. 2 is a process flow chart of operation of an integrated vehicle according to an exemplary embodiment.

Referring now to FIG. 2 a vehicle method 100 for integrating the vehicle sensors 20 of the vehicle 12 with the remote sensors 42 of the remote system 14 according to the principles of the present disclosure is shown. The vehicle method 100 begins at step 102 wherein the vehicle controller 16 receives data from the owner of the vehicle 12, the vehicle battery 22, the vehicle sensors 20, the vehicle communication service 46, and the remote system 14 (shown in FIG. 1). The data includes vehicle permissions set by the owner or operator of the vehicle 12, a voltage status of the vehicle battery 22, images from the vehicle cameras 24, opening alerts from the vehicle access detectors 26, threat alerts from the vehicle communication service 46, and threat alerts or instructions from the remote system 14. The vehicle method 100 then proceeds to step 104.

At step 104, the vehicle controller 16 determines an operational mode to set for the vehicle 12. The operational mode is a vehicle state that sets the level of activity of the plurality of vehicle sensors 20 and whether sensor input data should be recorded or transmitted. The operational mode includes a relaxed mode, a normal mode, and a cautious mode.

In the relaxed mode the vehicle cameras 24 are turned off so that usage of the vehicle battery 22 is reduced, yet the vehicle access detectors 26 are active. In the normal mode the vehicle access detectors 26 are active and the vehicle cameras 24 are turned on if the vehicle 12 engine is on or if the vehicle is charging. If the vehicle 12 engine is off or is not charging, then the vehicle cameras 24 are turned on periodically at a normal set schedule to capture images. For example, the periodic schedule may include capturing images every ten seconds, every five minutes, every ten minutes, etc. The periodic schedule may also be randomized. In the cautious mode the vehicle access detectors 26 are active and the vehicle cameras 24 are turned on if the vehicle 12 engine is on or the vehicle 12 is charging or if the voltage status exceeds a charge threshold, as discussed below. Otherwise, the vehicle cameras 24 are turned on periodically at a cautious set schedule that is more frequent than the normal set schedule so that the vehicle cameras 24 capture images more frequently than in the normal mode.

Determination of the operational mode is based on the voltage status of the battery 22, if the vehicle 12 engine is on or the vehicle 12 is charging, if the vehicle 12 has previously determined that there is a vehicle threat (as defined in step 110 below), if a threat alert has been provided by the remote system 14 or the vehicle communication service 46 and communicated to the vehicle 12, or if an activation request for setting a particular operational mode has been received from the vehicle communication service 46. For example, the vehicle controller 16 compares the voltage status received from the vehicle battery 22 to a charge threshold. The charge threshold is defined as 50% charge in the example provided. However, other charge levels may be employed. The voltage status is defined as low voltage when the battery charge level is less than the charge threshold.

As a default, when the vehicle 12 engine is on or charging, the vehicle controller 16 will put the vehicle 12 in the normal mode. When there is a vehicle threat, a provided threat alert, or an activation request the vehicle controller 16 will put the vehicle 12 in the cautious mode. When the battery 22 is low voltage, the vehicle controller 16 will put the vehicle in the relaxed mode However, the relaxed mode may be overridden when there is a vehicle threat detected by the vehicle 12, a threat alert provided by the vehicle communication service 46 or the remote system 14, or an activation request provided by an operator of the vehicle 12, the vehicle communication service 46 or the remote system 14. For example, when the vehicle 12 is located next to a remote system 14 that is actively monitoring for threats, the vehicle controller 16 will set the operational mode to the cautious mode. The vehicle method 100 then proceeds to step 106.

At step 106, the vehicle controller 16 determines what information or data can be shared with the remote system 14 and the vehicle communication service 46. Generally, any information not restricted by the owner of the vehicle 12, and that is not limited based on the operational mode, may be shared. For example, the owner of the vehicle 12 can determine what information may be shared and what information may not be shared and may set permissions that limit images from being shared, limiting a location of the vehicle, etc. This allows the owner of the vehicle 12 to address any privacy concerns. The operational mode limits what information may be shared when, for example, the vehicle battery 22 is low voltage, sharing of images from vehicle cameras 24 and other data may be limited to sharing only during an active threat (as defined at step 110 below). The vehicle method 100 then proceeds to step 108.

At step 108 the vehicle controller 16 shares information with the vehicle communication service 46 and with the remote system 14 based on what information is determined to be shareable in step 106. For example, the vehicle controller 16 shares a location of the vehicle 12, the operational mode, a detection mode of the remote system 14, threat alerts with the vehicle communication service 46, and sensor data from the vehicle sensors 20. The vehicle method 100 then proceeds to step 110.

At step 110 the vehicle controller 16 makes a vehicle threat determination based on sensor data from the vehicle sensors 20. The vehicle controller 16 determines an existence of a vehicle threat based on the sensor data from vehicle sensors 20. For example, a vehicle threat is determined to exist if a vehicle access detector 26 indicates an opening of a vehicle access component when the vehicle 12 is locked. A vehicle threat is also determined to exist when the vehicle controller 16 reviews images from the vehicle cameras 24 to make a vehicle threat determination based on the images. The vehicle controller 16 determines if the images from the vehicle cameras 24 include a dangerous item, a concerned face or person, or a known face or person. A dangerous item and a concerned face or person are threat concerns and a known face or person are not threat concerns. Information about dangerous items and a concerned face or person are provided by the vehicle communication service 46 and may be based on information from social media, a government, and security agencies, such as a police department, a sheriff office, and the federal bureau of investigation (the FBI). Information about a known face or person are created by the user of the remote system 14 and the owner of the vehicle 12 and is provided by the owner of the vehicle 12 and the remote system 14. A dangerous item is an item that may be associated with a criminal or harmful action, such as a gun, a rifle, a knife, a sword, an explosive device, or other type of weapon. A concerned face or person is based on a person or a person's face that is a threat concern, such as a criminal, a wanted person, or a jail escapee. A known face or person is based on a person or a person's face that is believed to be safe and not a threat concern, such as a family member, a friend, or a neighbor.

The vehicle controller 16 determines that a vehicle threat exists if the images from the vehicle cameras 24 include a dangerous item or a concerned face or person. The vehicle controller 16 determines a vehicle threat does not exist if the images from the vehicle cameras 24 solely include known faces or persons. The vehicle controller 16 can determine a possibility of a vehicle threat if the images from the vehicle cameras 24 include an unknown face or person and do not include a dangerous item or a concerned face or person. If no vehicle threat is determined the vehicle method 100 returns to step 102. If a vehicle threat is determined the vehicle method 100 then proceeds to step 112.

At step 112, the vehicle controller 16 communicates the vehicle threat alert with the remote system 14 and the vehicle communication service 46. The vehicle method 100 then proceeds to step 114.

At step 114, the vehicle controller 16 shares the sensor data from the vehicle sensors 20 that were used to determine the vehicle threat alert with the remote system 14. For example, the vehicle controller 16 shares the images from the vehicle cameras 24 with the remote system 14. The operational mode may limit what is shared and the frequency of sharing with the remote system 14. The operational modes control what vehicle cameras 24 are active and the frequency of the activation and deactivation of the vehicle cameras 24 such that a continuous sharing of images from the vehicle cameras 24 may not be possible. The vehicle method 100 then proceeds to step 116.

At step 116 the vehicle controller 16 monitors the identified threat and records the sensor data from the vehicle sensors 20. The vehicle method 100 then proceeds to step 118.

At step 118, the vehicle controller 16 determines if the identified threat has left a sensor range of the vehicle sensors 20 monitoring the identified threat. If the vehicle controller 16 determines that the identified threat has not left the sensor range of the vehicle sensors 20 monitoring the identified threat, the vehicle method 100 returns to step 116. If the vehicle controller 16 determines that the identified threat has left sensor range of the vehicle sensors 20 monitoring the identified threat, the vehicle method 100 proceeds to step 120.

At step 120 the vehicle controller 16 notifies the remote system 14 that the identified threat has left the sensor range of the vehicle sensors 20 monitoring the identified threat. The vehicle method 100 then returns to step 102.

Once the remote network controller 38 receives the vehicle threat alert and any shared data, the remote network controller 38 in response elevates to an ultra precision mode wherein the remote cameras 44 are active and recording.

Figure 3:
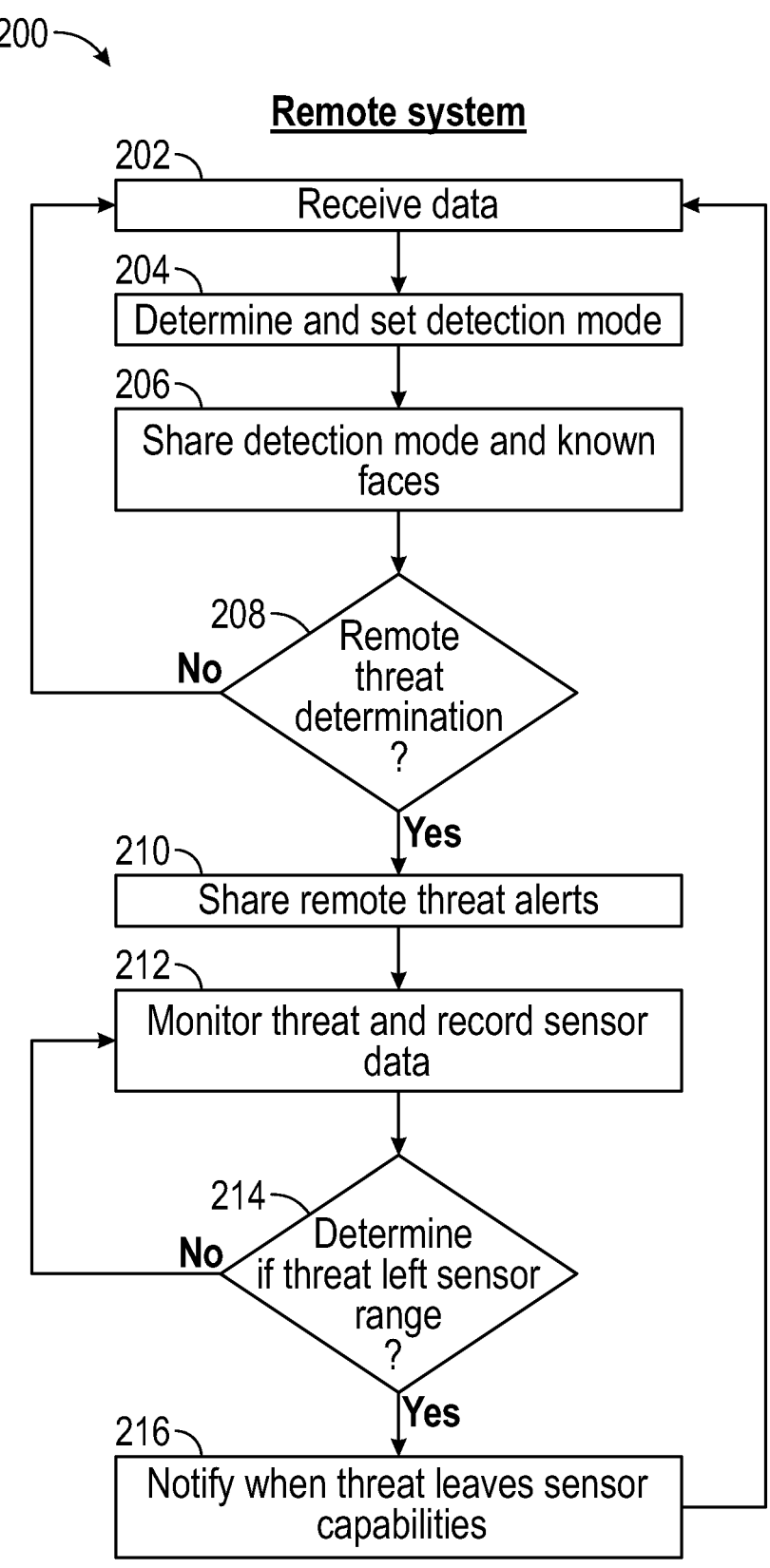
FIG. 3 is a process flow chart of operation of an integrated remote system according to an exemplary embodiment.

Referring now to FIG. 3, the remote system method 200 for integrating the vehicle sensors 20 of the vehicle 12 with the remote sensors 42 of the remote system 14 according to the principles of the present disclosure is shown. The remote system method 200 begins at step 202 wherein the remote network controller 38 receives data from a user of the remote system 14, the remote sensors 42, and the vehicle 12. The data from the user may reflect the user limiting activation of some remote sensors 42 due to approved activities on the premises 30, in the building 32, on the land 34, and in the driveway 36. The user may also limit or prevent the sharing of information from specific remote sensors 42 with the vehicle 12 to address any privacy concerns. The user limitations may prevent false or inaccurate remote threat alerts from the approved activities. The user may also provide information about known faces or persons that the remote system 14 can share with the vehicle 12 and can use to determine an image captured by a remote camera 44 is not a threat, as described below. The remote system method 200 then proceeds to step 204.

At step 204 the remote network controller 38 determines a detection mode for the remote system 14 and puts the remote system 14 in the determined detection mode. The detection mode includes a casual threat detection mode, a high precision threat detection mode, and an ultra precision threat detection mode. The casual threat detection mode has some or all of the remote sensors 42 turned off for a limited time period based on the user 45 wanting to limit activation of some remote sensors 42 due to approved activities on the premises 30, in the building 32, on the land 34, or in the driveway 36. The high precision threat detection mode is the normal mode and has all of the remote sensors 42 active so that the remote motions detectors 43 can detect motion and inform associated remote cameras 44 to turn on and capture images to detect and notify of threats and uses the normal algorithm. The ultra precision threat detection mode has all the remote sensors 42 active with the remote motion detectors 43 detecting motions and all of the remote cameras 44 on all of the time and capturing images to detect and notify of threats using a most accurate algorithm to analyze images from the remote cameras 44. Determination of the detection mode being other than the default high precision threat detection mode is based on the user input or a desire to provide elevated threat detection. The default mode is the high precision threat detection mode and the remote network controller 38 will put the remote system 14 in the high precision threat detection mode unless the remote network controller 38 receives a request from the user or a threat is detected or a threat alert is received or an activation request is received. If a request from the user 45 to reduce the detection mode is received the remote network controller 38 will put the remote system 14 in the casual threat detection mode. If a threat is detected by the remote system 14 or a threat alert is received from the vehicle 12 or an activation request is received from the vehicle 12 the remote network controller 38 will put the remote system 14 in the ultra precision threat detection mode. The remote system method 200 then proceeds to step 206.

At step 206 the remote network controller 38 shares information with the vehicle 12. The remote network controller 38 shares the detection mode with the vehicle 12 and shares the information about known faces or persons that the user has indicated are not threats. The remote system method 200 then proceeds to step 208.

At step 208 the remote network controller 38 makes a remote threat determination based on sensor data from the remote sensors 42. The remote network controller 38 determines an existence of a remote threat based on the sensor data from the remote sensors 42. The remote network controller 38 reviews images from the remote cameras 44 to make a remote threat determination based on the images. The remote network controller 38 determines if the images from the remote cameras 44 include a dangerous item, a concerned face or person, or a known face or person, as discussed above. Information about dangerous items, a concerned face or person, and a known face or person can be provided by the vehicle 12. The remote network controller 38 determines that a remote threat exists if the images from the remote cameras 44 include a dangerous item or a concerned face or person. The remote network controller 38 determines a remote threat does not exist if the images from the remote cameras 44 solely include known faces or persons. The remote network controller 38 can determine a possibility of a remote threat if the images from the remote cameras 44 include an unknown face or person and do not include a dangerous item or a concerned face or person. If no remote threat is determined the remote system method 200 returns to step 202. If a remote threat is determined the remote system method 200 then proceeds to step 210.

At step 210, the remote network controller 38 has determined the existence of a remote threat and will share the existence of the determined remote threat as a remote threat alert. The remote network controller 38 shares the remote threat alert with the vehicle 12. The remote system method 200 then proceeds to step 212. Once the vehicle 12 receives the remote threat alert and any shared data, the vehicle controller 16 reviews the received remote threat alert and modifies an operational mode of the at least one vehicle sensor based on the received remote threat alert.

At step 212, the remote network controller 38 monitors the identified threat and records the sensor data from the remote sensors 42. The remote system method 200 then proceeds to step 214.

At step 214, the remote network controller 38 determines if the identified threat has left the sensor range of the remote sensors 42 being able to monitor the identified threat. If the remote network controller 38 determines that the identified threat has not left the sensor range of the remote sensors 42 being able to monitor the identified threat, the remote system method 200 returns to step 212. If the remote network controller 38 determines that the identified threat has left the sensor range of the remote sensors 42 being able to monitor the identified threat, the remote system method 200 proceeds to step 216.

At step 216 the remote network controller 38 notifies the vehicle 12 that the identified threat has left the sensor range the remote sensors 42 being able to monitor the identified threat. The remote system method 200 then returns to step 202.

Referring now to FIG. 4, the vehicle communication service method 300 for integrating the vehicle sensors 20 of the vehicle 12 with the remote sensors 42 of the remote system 14 according to the principles of the present disclosure is shown. The vehicle communication service method 300 begins at step 302 wherein the vehicle communication service 46 receives data from the vehicles 12. The data from vehicles 12 includes vehicle threat alerts, vehicle location, vehicle operational mode, and remote system detection mode. The vehicle communication service method 300 then proceeds to step 304.

At step 304, the vehicle communication service 46 shares information about dangerous items and concerned faces or persons that may be discovered in an image and are threat concerns with the vehicles 12. The vehicle communication service method 300 then proceeds to step 306 and to step 312.

At step 306, the vehicle communication service 46 determines if a threat has been detected by reviewing the data provided by the vehicles 12. The vehicle communication service 46 determines that a threat has been detected if a threat alert has been provided by a vehicle 12. The vehicle communication service 46 determines that a threat has not been detected if no threat alerts have been provided by a vehicle 12. If no threats have been detected, the vehicle communication service method 300 returns to step 302. If a threat has been detected, the vehicle communication service method 300 then proceeds to step 308.

Figures 5, 6:
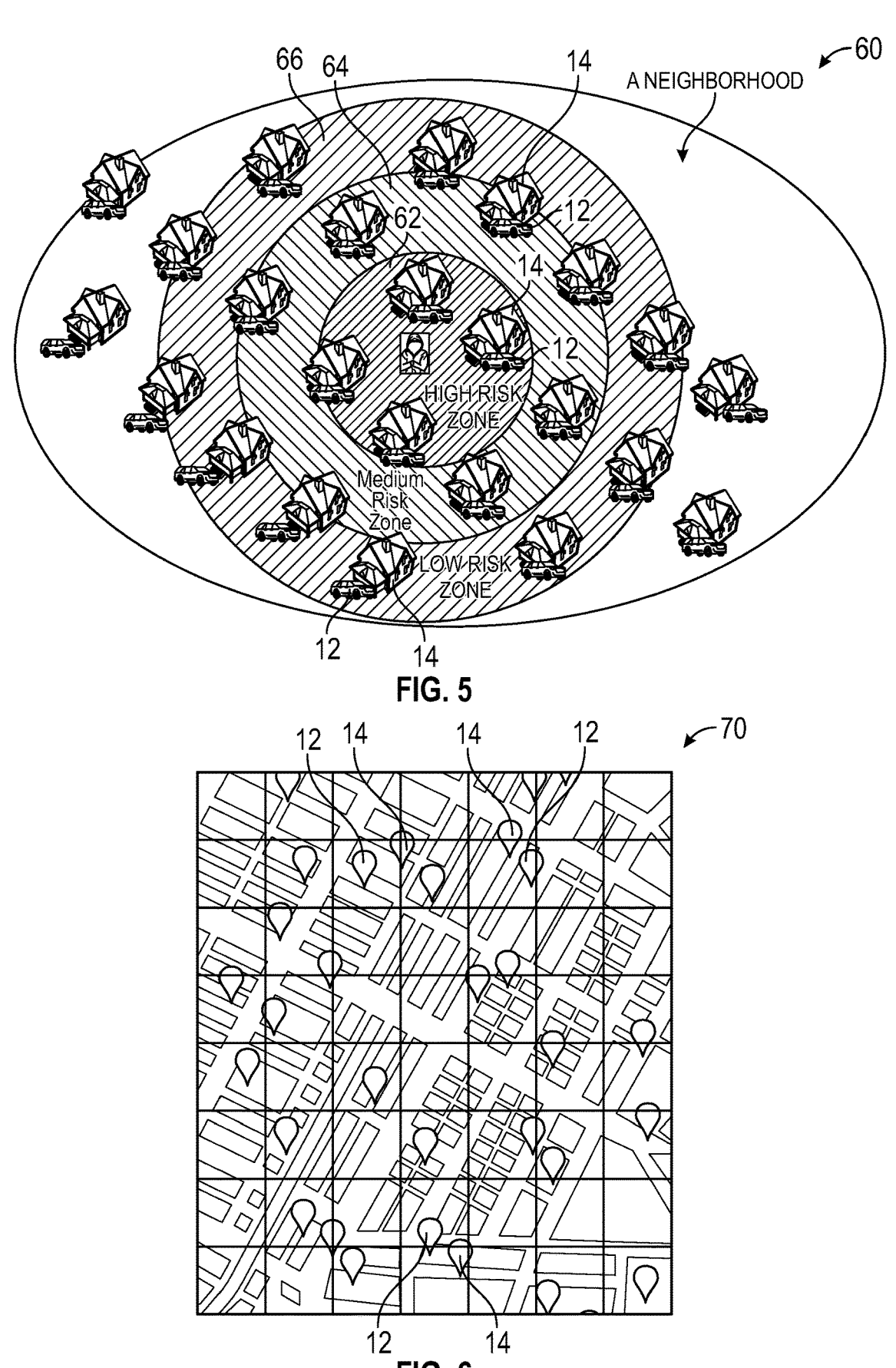
FIG. 5 is a schematic view of a created geographic area of concern according to an exemplary embodiment.
FIG. 6 is a schematic view of a created geographic area for random security activation according to an exemplary embodiment.

Referring to FIG. 4 and FIG. 5, at step 308 the vehicle communication service 46 determines a geographic area of concern 60 based on the location of the vehicle 12 that provided the threat alert. The geographic area of concern 60 identifies risk zones having differing risk levels based on the distance from the location of the vehicle 12 providing the threat alert. The geographic area of concern 60, includes a high risk zone 62 that contains and surrounds the location of the vehicle 12 that provided the threat alert, a medium risk zone 64 outside of and surrounding the high risk zone 62, and a low risk zone 66 outside of and surrounding the medium risk zone 64. The area, size, and shape of the risk zones 62, 64, and 66 can vary based on the number and locations of multiple threat alerts, the features of the areas, and the nature of the threat alerts. The risk zones 62, 64, and 66 may each include vehicles 12 and remote systems 14 communicating with the vehicles 12. The vehicle communication service method 300 then proceeds to step 310.

At step 310, the vehicle communication service 46 shares the threat detections with the vehicles 12 in the geographic area of concern 60 and can share a risk level based on the risk zones 62, 64, and 66 that the vehicles 12 are located in. The vehicles 12, as described above, can share the received threat alerts with the remote systems 14 that are in communication. The vehicle communication service method 300 then returns to step 302.

Referring to FIG. 4 and FIG. 6, steps 312 to 320 are utilized to provide an unpredictable location and activation of threat detection systems, such as vehicles 12 and remote systems 14, so that it is difficult or impossible for intruders and criminals to know or predict areas that are not protected by active threat detection systems. In step 312, the vehicle communication service 46 determines a geographic area 70 for random activation of vehicles 12 and remote systems 14 in the geographic area 70. The geographic area 70 can vary in size and location. The vehicle communication service method 300 then proceeds to step 314.

In step 314, the vehicle communication service 46 determines a desired operational mode for vehicles 12 and a desired detection mode for remote systems 14 in the geographic area 70. The vehicle communication service method 300 then proceeds to step 316.

In step 316, the vehicle communication service 46 determines the vehicles 12 that are located in the geographic area 70. The vehicle communication service method 300 then proceeds to step 318.

In step 318, the vehicle communication service 46 randomly selects vehicles 12 located in the geographic area 70. The vehicle communication service method 300 then proceeds to step 320.

In step 320, the vehicle communication service 46 sends an activation request to the vehicles 12 selected in step 318. The activation request includes the desired operational mode and detection mode as determined in step 314. The vehicles 12 may initiate the requested operational mode and will share the requested activation with associated remote systems 14. The remote systems 14 may initiate the requested detection mode. The vehicle communication service method 300 then returns to step 302.

Through the system 10, the vehicle controller 16, the remote network controller 38, and the vehicle communication service 46 may be able to determine the existence of a threat based on received sensor data from any source. For example, the vehicle controller 16 may be able to determine that a threat exists based on images and data received from the remote sensors 42, the remote network controller 38 may be able to determine that a threat exists based on images and data from the vehicle sensors 20, and the vehicle communication service 46 may be able to determine that a threat exists based on images and data from the vehicle sensors 20 and/or the remote sensors 42. Additionally, while the vehicle controller 16, the remote network controller 38 and the vehicle communication service 46 may individually make threat determinations they may also work together to make threat determinations.

The system 10 for integrating vehicle sensors with remote system sensors provides many advantages. The system 10 enhances vehicle safety by leveraging remote (home, office, etc.) systems sensing and processing capabilities. In addition, detected threats can be uploaded to the cloud and further help vehicles and homes in the neighborhood in situational awareness and potential threat detection.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for integrating vehicle sensors with remote system sensors, the system comprising:
   a vehicle including:
      a vehicle controller;
      at least one vehicle sensor in communication with the vehicle controller, the at least one vehicle sensor configured to generate vehicle sensor data associated with a vehicle threat alert; and
      a vehicle communication device in communication with the vehicle controller and configured to transmit the vehicle sensor data;
   a remote system including:
      a remote network controller;
      at least one remote sensor in communication with the remote network controller, the at least one remote sensor configured to generate remote sensor data associated with a remote threat alert; and
      a communication hub in communication with the remote network controller and the vehicle communication device,
   wherein the vehicle and the remote system communicate through the communication hub, the vehicle is configured to share vehicle threat alerts with the remote system and receive remote threat alerts from the remote system, the vehicle controller reviews received remote threat alerts and modifies an operational mode of the at least one vehicle sensor based on the received remote threat alerts, and the remote network controller reviews received vehicle threat alerts and modifies a detection mode of the remote system based on the received vehicle threat alerts, and wherein the detection mode of the remote system includes:
   a casual threat detection mode wherein the at least one remote sensor is turned off for a limited time period based on an input of a user of the remote system;
   a high precision threat detection mode which is a default detection mode and wherein the at least one remote sensor is informed to activate and to generate remote sensor data associated with a remote threat alert; and
   an ultra precision threat detection mode wherein the at least one remote sensor is active on a continuous basis to generate remote sensor data associated with a remote threat alert.

2. The system of claim 1, wherein the at least one vehicle sensor includes a vehicle camera configured to capture images and send the images to the vehicle controller and a vehicle access detector operable to detect opening of a vehicle access component, and the vehicle controller includes a vehicle processor and a vehicle memory, the vehicle memory including instructions such that the vehicle processor is programmed to:
   share a location of the vehicle with the remote system;
   determine the vehicle threat alerts based on images from the vehicle camera and status of the vehicle access detector;
   communicate with the remote system;
   control operation of the vehicle camera;
   review communications received from the remote system; and
   share the vehicle threat alerts with the remote system.

3. The system of claim 1, wherein the at least one vehicle sensor includes a vehicle camera configured to capture images and send the images to the vehicle controller and a vehicle access detector configured to detect opening of a vehicle access component, and the vehicle controller includes a vehicle processor and a vehicle memory, the vehicle memory including instructions such that the vehicle processor is programmed to:
   share a location of the vehicle with the remote system;
   determine the vehicle threat alerts based on images from the vehicle camera and status of the vehicle access detector;
   communicate with the remote system;
   control operation of the vehicle camera;
   review communications received from the remote system; and
   share the vehicle threat alerts with the remote system.

4. The system of claim 3, wherein the vehicle has a battery and the vehicle processor is further programmed to:
   ascertain a voltage status of the battery;
   control the operational mode based on the voltage status;
   put the vehicle in the relaxed mode when the voltage status is a low voltage;
   limit changes to the operational mode out of the relaxed mode when the voltage status is a low voltage to a receipt of a remote threat alert or a threat alert from the vehicle access detector; and
   inform the remote system of the operational mode.

5. The system of claim 3, wherein the remote system creates the remote threat alert when a remote person is detected by the at least one remote sensor and notifies the vehicle when the remote person moves beyond a sensor range of the at least one remote sensor and the controller puts the vehicle in the cautious mode, and the vehicle creates the vehicle threat alert when a vehicle person is detected by the at least one vehicle sensor and notifies the remote system when the vehicle person moves beyond the sensor range of the at least one vehicle sensor and the remote system changes the detection mode to a high precision threat detection mode or an ultra precision threat detection mode.

6. The system of claim 2, wherein the vehicle processor is further programed to limit information shared with the remote system based on information approval provided by an owner of the vehicle.

7. The system of claim 2, wherein there are a plurality of vehicles and remote systems and further comprising a vehicle communication service communicating with the vehicles through cellular networks, and wherein the vehicles share vehicle threat alerts and vehicle locations with the vehicle communication service, the vehicle communication service identifies a geographic area of concern based on received vehicle threat alerts and communicates a threat detection to vehicles in the geographic area of concern, and the vehicles receiving the threat detection communicate the threat detection to associated remote systems.

8. The system of claim 7, wherein the vehicle communication service provides information about threat images that are threat concerns based on a person or dangerous item in an image and the vehicle processor is further programmed to: identify a threat alert by determining if the image captured by the vehicle camera includes threat images as provided by the vehicle communication service, and the remote systems provide information about person images that are not a threat concern and the vehicle processor is further programmed to: identify a camera image as not a threat alert based the person images provided by the remote systems.

9. The system of claim 7, wherein the vehicle communication service changes the geographic area of concern and communicates the threat detection to vehicles in the changed geographic area of concern, and the vehicles receiving the threat detection communicate the threat detection to associated remote systems.

10. A method of integrating a vehicle having at least one vehicle sensor configured to generate vehicle sensor data associated with a vehicle threat alert with a remote system having at least one remote sensor configured to generate remote sensor data associated with a remote threat alert, the method comprising:

communicating a location of the vehicle to the remote system;

communicating the vehicle threat alerts with the remote system;

communicating the remote threat alerts with the vehicle;

modifying an operational mode of the at least one vehicle sensor based on received remote threat alerts; and modifying a detection mode of the remote system based on received vehicle threat alerts, wherein the at least one vehicle sensor includes a vehicle camera configured to capture images and a vehicle access detector configured to detect opening of a vehicle access component, the method further comprising:

determining the vehicle threat alerts based on images from the vehicle camera and status of the vehicle access detector;

controlling operation of the vehicle camera based on the operational mode; and reviewing communications received from the remote system;

wherein the vehicle has a battery and the method further comprises:

ascertaining a voltage status of the battery;

adjusting the operational mode based on the voltage status so that the vehicle camera is deactivated when the voltage status is a low voltage;

limiting activation of the vehicle camera when the voltage status is a low voltage to a receipt of a remote threat alert or a threat alert from the vehicle access detector; and informing the remote system of the operational mode.

11. The method of claim 10, wherein the method further comprises:

the remote system notifying the vehicle of a remote person concern when a remote system detected person moves beyond a sensor range of a remote sensor; and activating the vehicle camera when notified of the remote person concern.

12. The method of claim 10, wherein the method further comprises:

the vehicle notifying the remote system of a vehicle person concern when a vehicle detected person moves beyond a sensor range of the vehicle camera; and activating at least one remote sensor when notified of the vehicle person concern.

13. The method of claim 10, wherein there are a plurality of vehicles and remote systems and further comprising a vehicle communication service communicating with the vehicles through cellular networks, the method further comprises:

the vehicle communication service providing information about threat images that are threat concerns based on a person or dangerous item in an image;

the remote systems providing information about person images that are not a threat concern;

the vehicles identifying a camera image as not a threat based the information about person images provided by the remote systems;

the vehicles identifying threat alerts by determining if the image captured by the vehicle camera includes threat images as provided by the vehicle communication service;

the vehicles sharing vehicle threat alerts and vehicle locations with the vehicle communication service;

the vehicle communication service identifying a geographic area of concern based on received vehicle threat alerts;

the vehicle communication service communicating a threat detection to vehicles in the geographic area of concern; and the vehicles receiving the threat detection communicating the threat detection to associated remote systems.

14. A vehicle integrating vehicle sensors with a remote system, the vehicle comprising:

a vehicle controller including a processor and a memory;

vehicle sensors configured to generate vehicle sensor data associated with a vehicle threat alert, the vehicle sensors including vehicle cameras configured to capture images and send the images to the vehicle controller and vehicle access detectors configured to detect opening of a vehicle access component; and a vehicle communication device in communication with the vehicle controller, configured to transmit the vehicle sensor data, and in communication with a remote system communication hub, wherein the memory includes instructions such that the processor is programmed to:

communicate with remote systems;

review remote threat alerts received from the remote system;

control an operational mode of the vehicle sensors and activate the vehicle cameras as needed based on communication received from the remote system;

share images from the vehicle cameras with the remote system if the vehicle cameras are activated and the vehicle is communicating with the remote system;

determine the vehicle threat alerts based on images from the vehicle camera and status of the vehicle access detector;

share the vehicle threats alert with the remote system; and communicate a location of the vehicle with the remote system;

wherein the processor is further programmed to modify the operational mode based on received remote threat alerts and wherein the operational mode includes:

a relaxed mode wherein the vehicle cameras are turned off and the vehicle access detectors are on;

a normal mode wherein the vehicle access detectors are on and the vehicle cameras are randomly turned on and off and are turned on when the vehicle access detectors sense a threat and the vehicle camera images are transmitted to the remote system; and a cautious mode wherein the vehicle cameras are active and the vehicle camera images are transmitted to the remote system and the vehicle access detectors are on.

15. The vehicle of claim 14, wherein the vehicle has a battery and the vehicle processor is further programmed to:

ascertain a voltage status of the battery;

control the operational mode based on the voltage status;

put the vehicle in the relaxed mode when the voltage status is a low voltage;

limit changes to the operational mode out of the relaxed mode when the voltage status is a low voltage to a receipt of a remote threat alert or a vehicle threat alert from the vehicle access detectors; and inform the remote system of the operational mode.

16. The vehicle of claim 14, wherein the vehicle further includes a wireless communication device configured to communicate with a vehicle communication service that communicates with other vehicles having a cellular network device, the controller is in communication with the cellular network device, and wherein the processor is further programed to:

share threat detections with the vehicle communication service and the remote system;

receive notification of threats from the vehicle communication service;

communicate received threats to the remote system;

ascertain status of the vehicle; and activate the vehicle camera based on the status of the vehicle when notified of threats and share detected threats when notified of a threat.

* * * * *